Oct. 11, 1949.        A. C. VELDHUIS                2,484,197
              WIND-DRIVEN ELECTRIC POWER PLANT
                    Filed Jan. 28, 1948
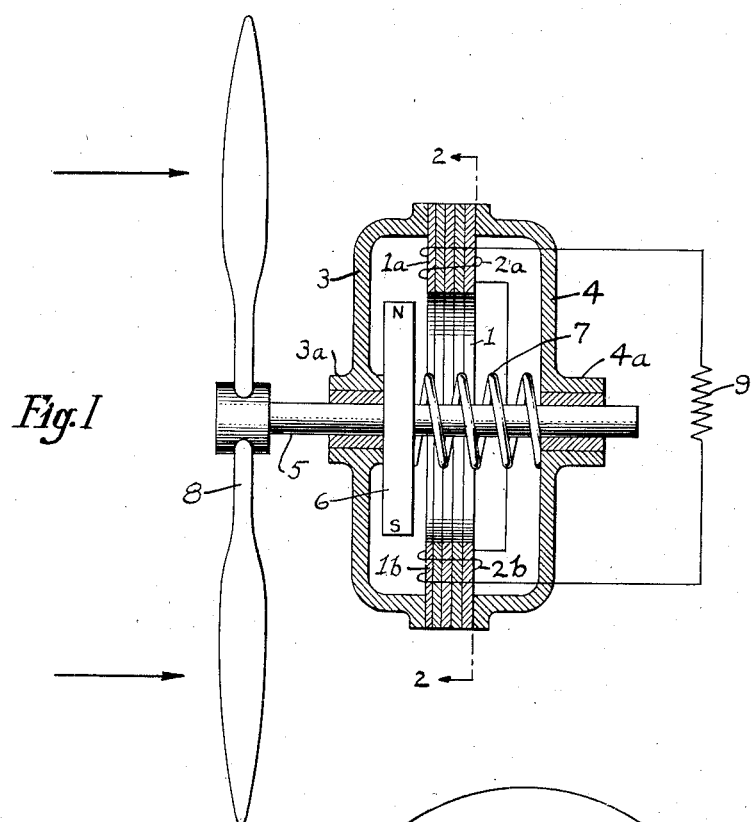
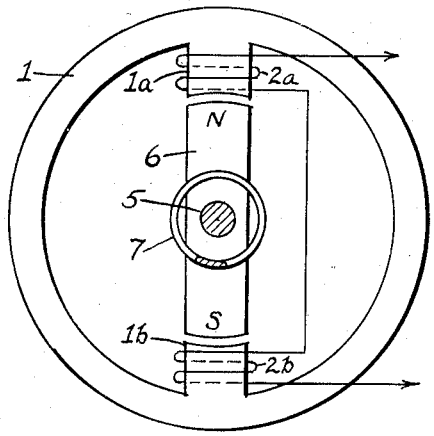
Inventor
ALBERT C. VELDHUIS
By  Ralph B. Stewart
                ATTORNEY.

Patented Oct. 11, 1949

2,484,197

UNITED STATES PATENT OFFICE 2,484,197

WIND-DRIVEN ELECTRIC POWER PLANT

Albert C. Veldhuis, West Chester, Pa., assignor to Robert W. Weeks, West Chester, Pa.

Application January 28, 1948, Serial No. 4,724

5 Claims. (Cl. 290—44)

This invention relates to electric power plants in which a dynamo-electric generator is driven by a fluid current motor such as a wind turbine or wind motor.

An object of the invention is to devise an arrangement for regulating the output of the generator in dependence upon the velocity of the wind or fluid current to obtain maximum power output at different velocities.

The amount of power available in a fluid stream is proportional to the cube of the velocity of the stream, and one specific object of the present invention is to devise an arrangement for varying the power output of the generator in proportion to the cube of the velocity of the wind or fluid current stream.

One form of my invention is illustrated in the accompanying drawing in which

Figure 1 is a side view of a dynamo generator and a wind motor according to my invention, the dynamo being shown in section along a vertical plane passing through the axis of the generator; and Figure 2 is a sectional view of Figure 1 taken along the line 2—2.

The generator of the power plant preferably is of the induction type and is illustrated somewhat diagrammatically in Figures 1 and 2. It consists of a laminated ring 1 of magnetic material provided with inwardly projecting pole pieces 1a and 1b arranged on opposite sides of the ring 1 which forms the stationary part of the field system of the generator. The poles 1a and 1b carry windings 2a and 2b, respectively. The ring 1 is clamped between two end bells 3 and 4 which carry bearings 3a and 4a respectively in which is journaled the generator and motor shaft 5. A magnetic armature 6 is mounted on the shaft 5 and rotates past pole pieces 1a and 1b. I prefer to use a permanent magnet for the armature 6 as shown in the drawing, but the armature may be excited by an exciting winding if desired.

The supporting bearings 3a and 4a for the shaft 5 are spaced apart to permit axial movement of the shaft 5 and the armature 6, and a biasing spring 7 surrounding the shaft within the generator housing normally serves to hold the armature 6 out of alignment with the pole pieces 1a and 1b and in contact with the bearing 3a as shown in Figure 1. In this position of the armature, the amount of flux passing through the pole pieces 1a and 1b from the armature 6 is at a minimum.

A wind motor or turbine 8 of any suitable design is mounted on the end of shaft 5 projecting through the bearing 3a as shown in Figure 1. It will be understood that power plant assembly shown in Figure 1 is suitably mounted to turn about a vertical axis and is provided with conventional means to keep the wind motor facing into the wind. Such mounting structure forms no part of my invention and is not illustrated in the drawing.

The operation of the power plant is as follows: The coils 2a and 2b of the generator are connected in series and connected to a suitable load represented at 9. For low wind velocities, the armature will be rotated by the motor 8 in the position shown in Figure 1 where the alternating current voltage generated in coils 2a and 2b will be of low magnitude due to the fact that a small flux from the armature 6 energizes the pole pieces 1a and 1b. As the velocity of the wind increases, the amount of thrust exerted by the motor 8 on the shaft 5 increases and compresses the spring 7 to move the armature 6 towards the pole pieces 1a and 1b, thereby increasing the flux and correspondingly increasing the magnitude of the voltage generated in the coils 2a and 2b. At a certain high wind velocity, the axial thrust will be sufficient to move the armature 6 into alignment with the pole pieces 1a and 1b and maximum power of the generator will be delivered.

The generator output power is proportional to the product of the speed of the armature times the strength of the magnetic field acting upon the poles 1a and 1b. The speed of the armature varies as the first power of the velocity of the wind, and the magnetic flux through the pole pieces 1a and 1b is determined by the position of the armature 6 with respect to these pole pieces. Since the axial thrust exerted by the wind motor 8 on the shaft 5 is proportional to the square of the wind velocity, it is possible, by properly shaping the ends of pole pieces 1a and 1b and armature 6 and by proper design of spring 7, to have the field strength of the generator vary in proportion to the square of the wind velocity. Accordingly, with the speed of the generator varying according to the first power of the velocity, and the field strength varying according to the square of the velocity, the power output of the generator will vary according to the cube of the velocity.

The principle of my invention has been illustrated and described by reference to simple structures involving a two-bladed wind motor and a bipolar generator, but it will be understood that the specific construction of the motor and the generator is not important except as specifically claimed hereinafter. It will also be understood that my invention is not limited to the use of a wind motor but other types of fluid current motors may be used if desired.

I claim:

1. In a fluid current power plant, the combination of a dynamo-electric generator having an axially shiftable shaft and an armature carried by said shaft and being shiftable out of alignment with the generator poles, a fluid current motor mounted on said shaft, biasing means for yieldably urging said shaft in a direction opposed to the fluid current stream and normally holding said armature out of alignment with said poles, said biasing means being yieldable under the pressure of the fluid stream acting on said motor to move said armature towards a position of alignment with said poles.

2. In a fluid current power plant, the combination of a dynamo-electric generator, a fluid current motor driving said generator at a speed proportional to the velocity of the fluid current, said motor having an axially shiftable shaft movable under the pressure of the fluid stream, means regulating the axial movement of said shaft in dependence upon the velocity of said fluid stream and means controlled by the movement of said shaft for varying the field strength of said generator.

3. A fluid current power plant according to claim 2 wherein the field strength of the generator is increased as the velocity of the fluid current increases.

4. In a fluid current power plant, the combination of a dynamo-electric generator having an axially shiftable shaft and an armature carried by said shaft and being shiftable out of alignment with the generator poles, biasing means for yieldably urging said shaft in a direction to normally hold said armature out of alignment with said poles, and means responsive to the pressure of the fluid stream to variably move said armature towards a position of alignment with said poles.

5. In a fluid current power plant, the combination of a dynamo-electric generator having a movable element included in the magnetic circuit of the field thereof, means normally biasing said movable element into a position of reduced field strength, a fluid current motor driving said generator at a speed proportional to the velocity of the fluid current, and means operative in dependence upon the velocity of said fluid stream to variably shift said movable element in a direction to increase the field strength of said generator as the velocity of said fluid current increases.

ALBERT C. VELDHUIS.

REFERENCES CITED

The following references are of record in the file of this patent:

UNITED STATES PATENTS

| Number | Name | Date |
| --- | --- | --- |
| 260,574 | Irwin | July 4, 1882 |
| 262,421 | Irwin | Aug. 8, 1882 |
| 403,017 | Wheeler | May 7, 1889 |
| 405,507 | Sandwell | June 18, 1889 |
| 720,661 | Brown | Feb. 17, 1903 |
| 937,099 | Schulze | Oct. 19, 1909 |
| 1,039,197 | Roth et al. | Sept. 24, 1912 |
| 1,070,437 | Ferguson | Aug. 19, 1913 |
| 1,131,435 | Snee et al. | Mar. 9, 1915 |
| 1,153,076 | Heinze, Jr. | Sept. 7, 1915 |
| 1,773,793 | Constantin | Oct. 21, 1930 |
| 1,813,496 | Kennedy et al. | July 7, 1931 |
| 2,148,804 | Claytor | Feb. 28, 1939 |
| 2,178,679 | Claytor | Nov. 7, 1939 |